(12) United States Patent
Lutnick et al.

(10) Patent No.: US 7,400,270 B2
(45) Date of Patent: *Jul. 15, 2008

(54) FULLY CONFIGURABLE TRADING KEYBOARD

(75) Inventors: Howard W. Lutnick, New York, NY (US); Joseph Noviello, New York, NY (US)

(73) Assignee: BGC Partners, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/856,159

(22) Filed: Sep. 17, 2007

(65) Prior Publication Data

US 2008/0001786 A1 Jan. 3, 2008

Related U.S. Application Data

(63) Continuation of application No. 11/126,781, filed on May 10, 2005, now Pat. No. 7,283,067.

(60) Provisional application No. 60/569,991, filed on May 10, 2004.

(51) Int. Cl.
*H03M 11/00* (2006.01)

(52) U.S. Cl. .................. 341/22; 345/168; 708/142

(58) Field of Classification Search ............. 341/22–26; 708/131, 140, 141, 142; 344/168; 400/472
See application file for complete search history.

(56) References Cited

U.S. PATENT DOCUMENTS 7,283,067 B2 * 10/2007 Lutnick et al. ................ 341/22

* cited by examiner

*Primary Examiner*—Timothy Edwards, Jr.
(74) *Attorney, Agent, or Firm*—Antonio Papageorgiou

(57) ABSTRACT

The present invention provides a trading keyboard that can be configured both physically and functionally according to a user's preferences. The trading keyboard preferably includes self-identifying key covers that can be physically arranged on any of the keyboard's key bases. Detection mechanisms included in the key bases detect the commands of the trading application associated with each self-identifying key cover. Therefore, the user may reposition the key covers on the keyboard according to the user's preferences, and yet retain the same functionality for the key covers. The user may also switch between keyboard modes that allow the keyboard to be functionally reconfigured. By selecting different modes, the user can chose between different keyboard mapping configurations that assign the functions of the trading application to the keys in different arrangements. The mode selection mechanism may also be used to select between different commands associated with a single key or key cover.

13 Claims, 7 Drawing Sheets

FULLY CONFIGURABLE TRADING KEYBOARD

CROSS-REFERENCES TO RELATED APPLICATIONS

This application is a continuation of U.S. patent application Ser. No. 11/126,781, filed May 10, 2005, now U.S. Pat. No. 7,283,067 which claims priority to Provisional Application No. 60/569,991, filed May 10, 2004, which are hereby incorporated herein by reference.

FIELD OF THE INVENTION

This invention relates to a fully configurable keyboard for use with electronic trading systems.

BACKGROUND OF THE INVENTION

Trading keyboards are often used by financial professionals to enter and execute commands in a trading application. The financial professionals who use trading keyboards may use different keyboards extensively in their work and become accustomed to particular arrangements of the keys on the trading keyboards. The financial professionals may therefore develop different preferences for physical or functional arrangements of the keys. Therefore, a financial professional may be faced with an unfamiliar trading keyboard when, for example, using a different trading system or a change is made to the trading application implemented on a processor. Using an unfamiliar trading keyboard may lead to costly data entry mistakes by the financial professional. As a result, trades that were not intended may be processed and volumes of trading orders may be incorrectly executed. Conventional trading keyboards do not allow the financial professional to change the physical and/or functional arrangements of the keys therein.

Moreover, trading keyboards should accommodate all of the commands that may be associated with a trading application. However, if an individual key were assigned to each and every possible command, the trading keyboard would be large and unwieldy to use.

Therefore, there is a need for a trading keyboard in which the key arrangement may be physically configurable by a user.

There is also a need for a trading keyboard in which the key arrangement may be configurable by the user without implicating the trading application.

There is also a need for a trading keyboard in which the key arrangement is functionally configurable by the user such that each key of the keyboard may be associated with different commands in each configuration.

SUMMARY OF THE INVENTION

It is an object of the invention to provide a fully configurable trading keyboard capable of satisfying the above-identified needs.

In accordance with this and other objects of the invention, a trading keyboard that can be configured according to a user's preferences is provided. Users may use the configurable keyboard to enter different trading commands or other commands into a processor that implements a trading application configured to receive and apply such commands. The keyboard preferably includes self-identifying key covers that can be physically arranged on any of the keyboard's key bases according to a user's preferences. The key bases are capable of detecting the function associated with each self-identifying key cover. Different commands may be associated with such a function. Therefore, the user may reposition different key covers on the keyboard by placing the key covers on any available key bases, and yet retain the same functionality for the key covers. Accordingly, the keyboard is physically configurable—i.e., the arrangement of the keys on the keyboard may be physically changed while the function associated with each key remains the same. The keyboard may be physically configured without implicating the trading application used in conjunction with the keyboard.

In another aspect of the invention, the user may switch between functional configurations—i.e., keyboard modes—that allow each key to send commands associated with different functions to a trading application whenever a different mode is selected. The same mode mechanism may alternatively be used to select between multiple commands associated with a self-identifying key cover. The keyboard may be equipped with memory in order to store different keyboard configurations and/or other information. In addition, the keyboard may implement a handshake protocol that enables its identification by the trading application using the information stored on the keyboard such as specific identifying information or particular keyboard configurations. Accordingly, the keyboard is also functionally configurable—i.e., the arrangement of the keys on the keyboard may be functionally changed such that each key may be associated with different commands in each configuration while remaining in the same physical location on the keyboard.

BRIEF DESCRIPTION OF THE DRAWING

The above and other objects and advantages of the invention will be apparent upon consideration of the following description, taken in conjunction with the accompanying drawings, in which.

DESCRIPTION OF THE INVENTION

This invention relates to a fully configurable trading keyboard. More particularly, this invention relates to a keyboard that can be completely physically or functionally rearranged by a user according the user's preferences. Such a keyboard may be used in conjunction with a trading application implemented on a processor that is coupled to the keyboard. The trading keyboard may be used as the input device in a workstation of the trading application system.

Figure 1:
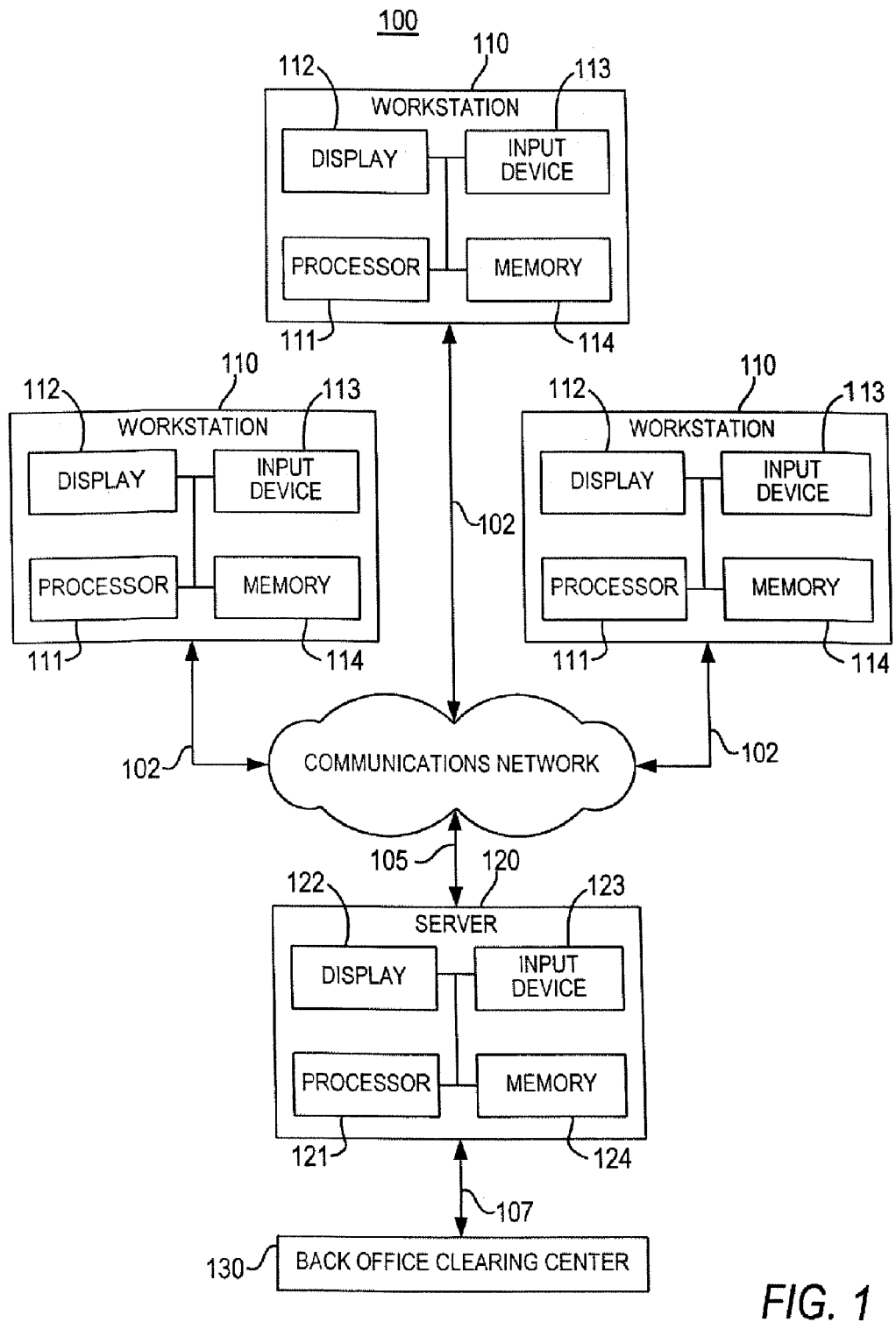
FIG. 1 is a block diagram of an exemplary system that may be used to implement the processes and functions of certain embodiments of the present invention.

Referring to FIG. 1, exemplary system 100 for implementing the invention is shown. As illustrated, system 100 may include one or more workstations 110. Workstations 110 may be local or remote, and are connected by one or more communications links 102 to computer network 103 that is linked via communications link 105 to server 120. Server 120 may be linked to back office clearing center 130 via communications link 107.

Server 120 may be any suitable server, processor, computer, data processing device, or combination of the same. Server 120 may be used to implement the governing logic that processes and executes orders and trades, and distributes trade and market information, including price and size information, to workstations 110. Computer network 103 preferably includes the Internet but may consist of any suitable computer network such as an intranet, a wide-area network (WAN), a local-area network (LAN), a wireless network, a digital subscriber line (DSL) network, a frame relay network, an asynchronous transfer mode (ATM) network, a virtual private network (VPN), or any combination of the same. Communications links 102 and 105 may be any communications links suitable for communicating data between workstations 110 and server 120, such as network links, dial-up links, wireless links, hard-wired links, etc.

Workstations 110 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 110 may be used by participants to enter bid, ask, buy and sell orders for the items being traded and view market activity corresponding to these items.

A typical workstation 110 may include processor 111, display 112, input device 113, and memory 114, which may be interconnected. In a preferred embodiment, memory 114 includes a storage device for storing a workstation program for controlling processor 111. Memory 114 may also store keyboard mapping configurations, as described below, and other data on the storage device. The workstation program may include the trading application and handshake protocol described below. Input device 113 may be used in conjunction with display 112 by users to enter bids/asks on desired items and to execute and monitor trades. Input device 113 may include a mouse, a trackball, a game controller, a touch pad, a keyboard, or any combination of the same. For example, input device 113 may include the trading keyboard according to the present invention. Input device 113 may be coupled to processor 111 through any communications link such as a network link, a wireless link, a hard-wired link, or any other suitable link. Processor 111 may use the workstation program to receive trade information relating to the items being traded by multiple users of system 100, or other users, and display such information on display 112 or communicate such information to display 112.

Server 120 may include processor 121, display 122, input device 123, and memory 124, which may be interconnected. In a preferred embodiment, memory 124 includes a storage device for storing a server program that provides the governing logic for controlling processor 121. Memory 124 may also store keyboard mapping configurations, as described below, and other data on the storage device. Processor 121 may use the server program to process orders and execute trades communicated from various workstations that are operated by multiple users of system 100, or other users, and communicate trade information, to workstations 110 and back office clearing center 130. More specifically, processor 121 may use the server program to process orders placed by users in response to users entering commands using input device(s) 113, and execute trades based on such orders, whenever applicable.

Back office clearing center 130 may be any suitable equipment, such as a computer, a laptop computer, a mainframe computer, etc., or any combination of the same, for causing trades to be settled and/or verifying that trades are settled. Communications link 107 may be any communications links suitable for communicating data between server 120 and back office clearing center 130, such as network links, dial-up links, wireless links, hard-wired links, etc.

Figure 2:
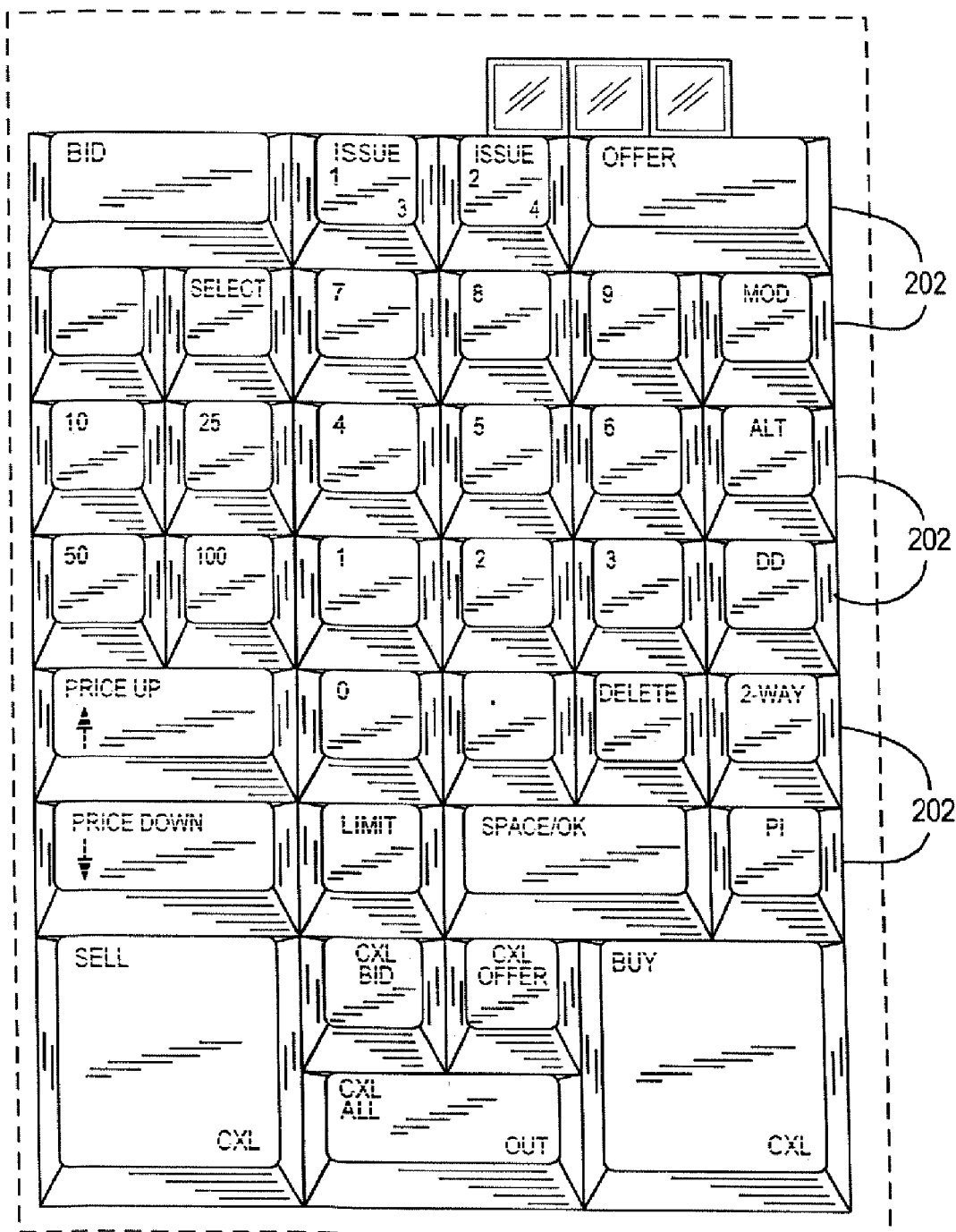
FIG. 2 is a top view of preferred embodiments of a fully configurable trading keyboard in accordance with the present invention.
Figure 3:
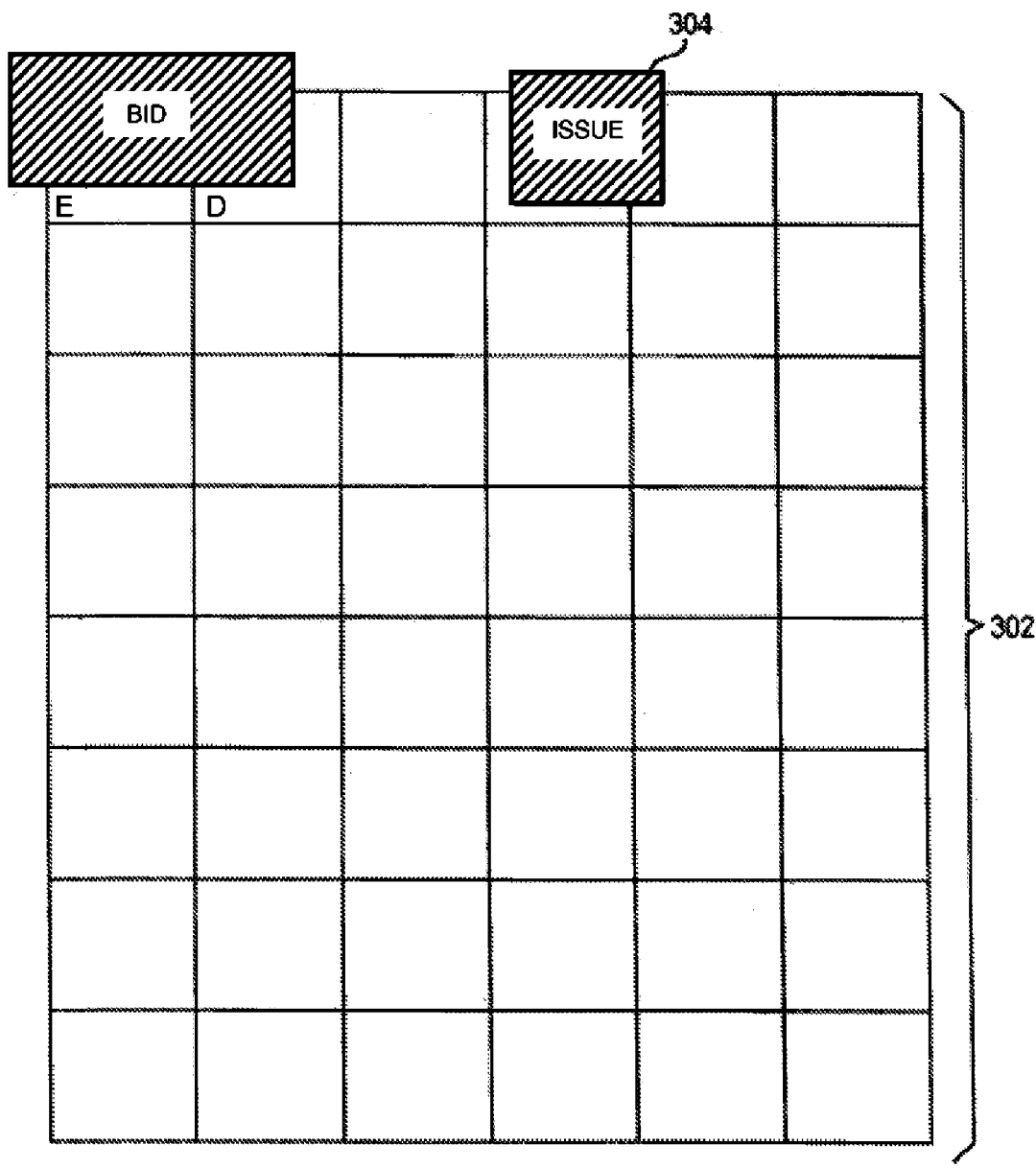
FIG. 3 is a top view of preferred embodiments of the fully configurable trading keyboard showing the key bases on which self-identifying key covers are placed in accordance with the present invention.

Preferred embodiments of the trading keyboard of the present invention which may be used as part of input device 113 of FIG. 1 are illustrated in FIGS. 2-5. In some preferred embodiments, the trading keyboard includes self-identifying key covers that may be arranged as desired on key bases. The key bases may be configured to detect the function associated with each self-identifying key cover. Different commands may be associated with a key function. As illustrated in FIG. 2, the trading keyboard may include keys 202 that represent functions of the trading application. As illustrated in FIG. 3, each key may include a key base 302 that is coupled to a signal generating source. With respect to most keys (e.g., trading keys), when the key received by key base 302 is struck, a signal is sent by the signal generating source to the trading application to perform a specific trading command. The trading keyboard may include key covers 304 that are detachable from key bases 302. Key covers 304 may be arranged on key bases 302 in any arrangement, thereby enabling the user to reconfigure the trading keyboard according to the user's preferences.

Each key cover 304 may include an identifying mechanism that identifies to key bases 302 the one or more commands of the trading application associated with a particular key cover. Each key base 302 may include a mechanism for detecting the identification mechanism included in key covers 304. For example, as shown in FIG. 3, key cover 304 may include an identifying mechanism that identifies that particular key cover as being associated with the "ISSUE" command of the trading application. In this way, when "ISSUE" key cover 304 is placed on any of the key bases 302, the detection mechanism of the key base on which the key cover has been placed will be able to determine that key cover 304 is associated with the "ISSUE" command.

The mechanism for identifying the command or group of commands (i.e., function) associated with each key cover may include a computer chip, a resistor, a bar code, Radio Frequency Identification Device (RFID), or any other suitable identification mechanism that is capable of interacting with the key bases. Each key base may include a detector or a reader, such as a bar code scanner, an ohm meter, or any other suitable mechanism for detecting the identification mechanism included in the key cover. In order to determine the command or function associated with a key cover placed on the key base, each key base may include or have associated therewith a device key for correlating any identifying mark or signal on the key cover with a particular command or function of the trading application. For example, "ISSUE" key cover 304 may include a three-ohm resistor. The key base on which "ISSUE" key cover 304 is placed may detect the three-ohm resistance value of the resistor and refer to the device key to correlate the three-ohm resistance value to the "ISSUE" command and thereby send the appropriate signal to the trading application to execute the "ISSUE" command.

In addition to the mechanism for identifying the commands or function associated with the key cover, each key cover 304 may also be labeled in a conventional manner to convey to the user the commands or function associated with the key cover. Additionally, each key base 302 may include a set of jumpers that may be used to enable or disable the key base. Moreover, because some of the keys on the keyboard may have different sizes, multiple key bases can be combined to act as a single larger key base, or vice versa. For example, a larger key cover may be accommodated by removing the key covers from a set of adjacent key bases, disabling all but one of the corresponding key bases, and replacing the removed key covers with a larger key cover that occupies substantially the same physical space as the removed key covers. Conversely, a single large key cover may be removed, the inactive key bases may be reactivated, and the large key cover may be replaced with a number of smaller key covers.

Identification of key covers may occur each time the key is enabled (e.g., by activating the jumpers in the corresponding key base), actuated (e.g., struck by a user), or placed on the key base. Identification may additionally or alternatively occur after the trading keyboard is coupled to a processor on which the trading application is implemented. Therefore, in this arrangement, each key cover may be placed on any key base (or plurality of suitable key bases where the key cover is sufficiently large to encompass more than one key base) in the keyboard, such that the key cover retains the function associated with the key cover, regardless of where the key cover is placed on the keyboard. In other words, every time any key base having a particular key cover is actuated, the same signal is transmitted from the keyboard, regardless of which key base the key cover has been placed on. A trading application that is implemented on the processor to which the keyboard is coupled is configured to receive such signals from the trading keyboard. In this arrangement, the trading application need not be notified of any changes in the physical configuration of the various keys on the keyboard, as the signals received by the trading application will not be affected by any physical reconfiguration.

In another aspect of the invention, the trading keyboard may be fitted with a mechanism that allows a user to select different functional configurations—i.e., modes—of the trading keyboard associated with different keyboard mappings. In order to receive the advantages of this aspect of the invention, the keyboard keys need not necessarily include self-identifying key covers and detecting key bases. Instead, each key may be conventionally configured to send one or more specific commands to the trading application implemented on the processor to which the keyboard is coupled.

Figure 4:
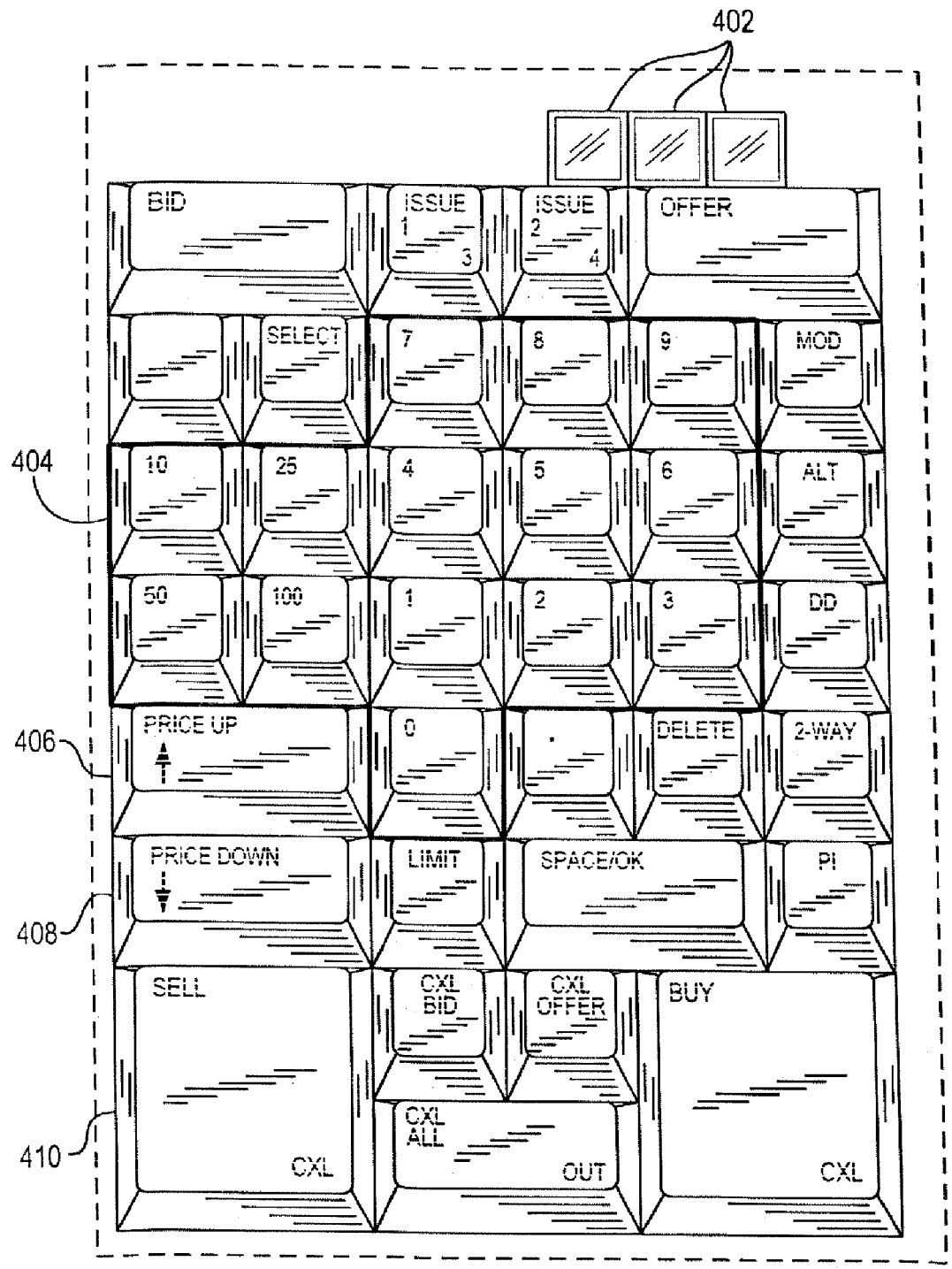
FIG. 4 is a top view of preferred embodiments of the fully configurable trading keyboard showing mode selection aspects of the keyboard in accordance with the present invention.

For example, as shown in FIG. 4, one or more mode keys 402 may be provided on the trading keyboard. In the conventional embodiment, in which the key covers are not self-identifying, each keyboard mapping associates a single function (i.e., a group of one or more commands of the trading application) with each key of the trading keyboard. Changing the keyboard mapping changes the function associated with at least some of the keys on the key board. The keyboard mapping may be changed by changing the mode of the keyboard. The desired keyboard mode may be specifically selected using mode keys 402. When one of such mode keys is depressed, the keyboard may be reconfigured such that a particular key is associated with a particular function that is different from the function associated with the particular key when the mode key was not depressed. If another one of the mode keys is depressed instead, the keyboard may be reconfigured such that the same key is associated with another different function. When both mode keys (or other suitable combination of mode keys) are depressed, the keyboard may be reconfigured such that the same key is associated with yet another different function.

Figure 5:
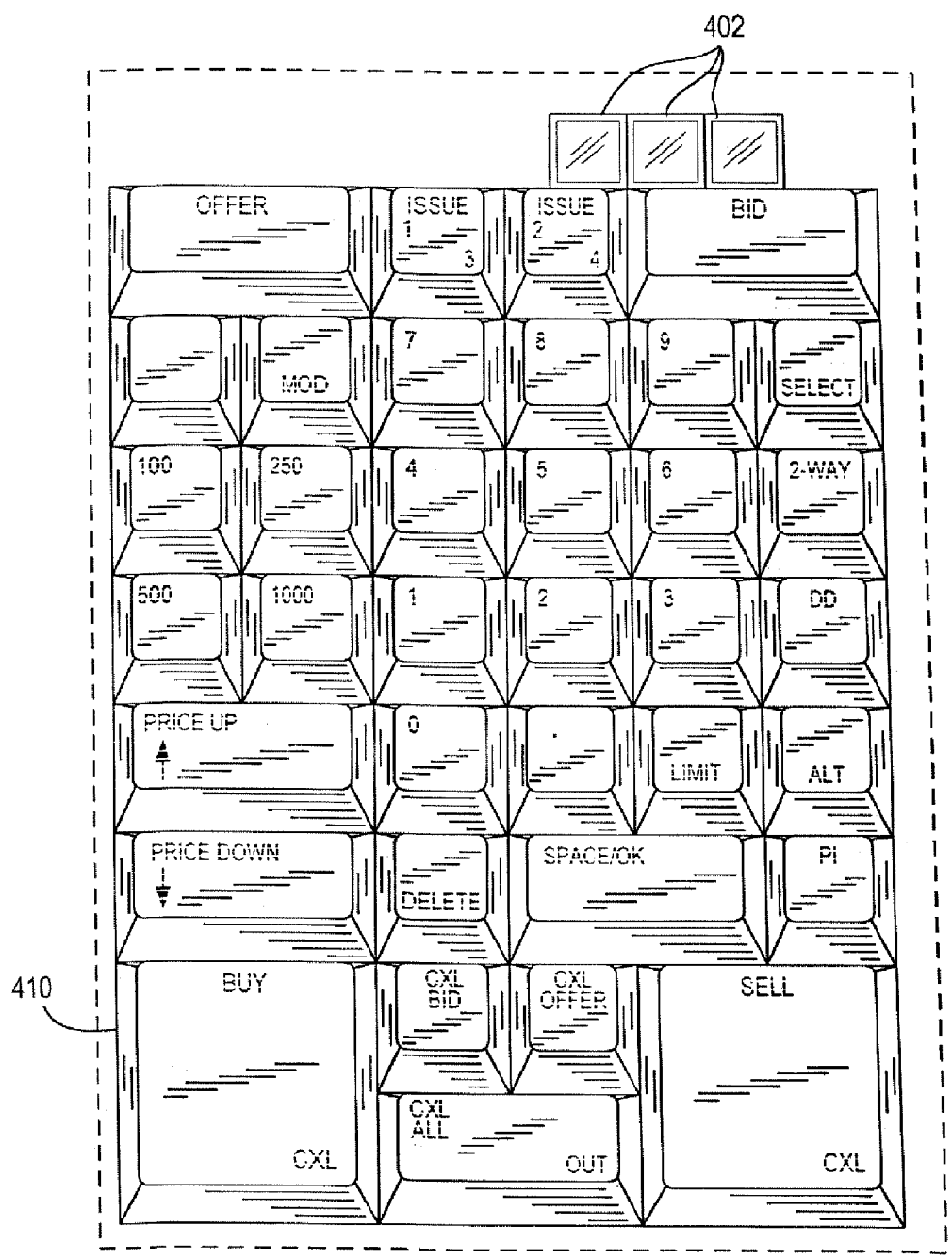
FIG. 5 is a top view of preferred embodiments of the fully configurable trading keyboard showing mode selection aspects of the keyboard in accordance with the present invention.

For example, as illustrated by FIG. 5, a functionally reconfigured version of the keyboard illustrated in FIG. 4 may be provided by depressing one of mode keys 402. Note that the identifiers shown on the keys of FIG. 5 illustrate the function associated with each key in this mode and may not actually be printed on the keys. In order to facilitate use of this aspect of the trading keyboard, different keyboard covers may be used to identify the function associated with each key in the different keyboard mapping configurations (i.e., modes of the keyboard). As shown in FIG. 5, each function available in the FIG. 4 keyboard has been retained, but many of the keys have been reassigned a different function in the FIG. 5 keyboard. For example, as illustrated in FIGS. 4 and 5, key 410 is associated with multiple functions "SELL/CXL" and "BUY/CXL." The "SELL/CXL" function includes the commands "SELL" and "CXL" of the trading application and the "BUY/CXL" function includes the commands "BUY" and "CXL." A mode selection made by the user (e.g., using mode keys 402) may change the activated function of key 410 from "SELL/CXL" (FIG. 4) to "BUY/CXL" (FIG. 5).

Alternatively, the mode selection mechanism may be used to select different modes that associate different commands with particular key covers for self-identifying keys. For example, a self-identifying key may be associated with a single function that includes four different commands, A, B, C, and D, of the trading application. Regardless of the key base on which the self-identifying key cover has been placed, the particular key cover is associated with command A when no mode key is pressed. Pressing a first mode button may change the command associated with the key cover from A to B. Pressing a second mode key may change the command from A to C, and by pressing a third mode key the command is changed from A to D, etc. Permutations of pressed and unpressed mode keys may be used to create a large number of modes from a few mode keys.

It should be understood that the mode selection mechanism may be additionally used with a keyboard that does not include self-identifying key covers to further select between commands associated with a single function (e.g., similar to a "SHIFT" or "ALT" key). This aspect of the invention, for example, may be used to help users who may want to trade more volume during a busier time of the day. One mode of the trading keyboard may be configured such that larger trade sizes are entered using keys that they would typically, under a different mode, be used to trade less volume. For example, as shown in FIG. 4, having one of the mode keys 402 in a depressed state may reconfigure some or all of the group of keys 404 associated with numbers to enter orders for a size that is multiplied by a predefined factor (e.g., ten times), as compared to the size associated with the same group of keys under a different mode. In another example, "PRICE UP" key 406 and "PRICE DOWN" key 408 may originally change the price of a trade by increments of $0.05. In an alternate mode, when a mode key 402 is pressed, keys 406 and 408 may change the price in increments of $0.50, $5.00, etc. In order to facilitate the use of this aspect of the trading keyboard, each key cover may be labeled with the one or more commands it is usually associated with. In addition, each key may also be labeled with the alternative commands it is associated with when the trading keyboard is in one or more alternate modes.

In essence, various keys may be adapted to perform more than a single function or command, depending on the mode chosen by a user, regardless of whether such keys were pressed individually, sequentially or simultaneously with other keys.

The trading keyboard may be equipped with memory in order to store different keyboard mapping configurations and other information such as identifying information. A particular keyboard mapping configuration may be communicated to the processor on which the trading application is implemented so that the trading application can recognize and interpret the different signals received from the keyboard in order to apply the corresponding commands. Alternatively, the keyboard may use the mapping configuration to generate signals that the trading application recognizes as appropriate commands without requiring any change in the way the trading application interprets the received signals. A particular keyboard mapping may be retrieved from a source other than the keyboard, such as workstation memory 114 or server memory 214, and placed in, or downloaded to, the keyboard memory.

The need for communicating keyboard configurations or identifying information may be precluded by the use of self-identifying keys. However, other identifying information, such as information that can be used to identify the keyboard manufacturer, provider, distributor, etc., may be communicated to the processor. Such information may be used in conjunction with a handshake protocol implemented between the keyboard and the processor. This protocol enables the identification of the keyboard by the trading application. If the identification process is not successful, either signals may not emanate from the keyboard or the trading application may discard all such signals. The keyboard may preferably be fitted with a mechanism that indicates whether the identification was successful. For example, an Light Emitting Display (LED) on the keyboard may be lit indicating that identification was successful.

Figure 6:
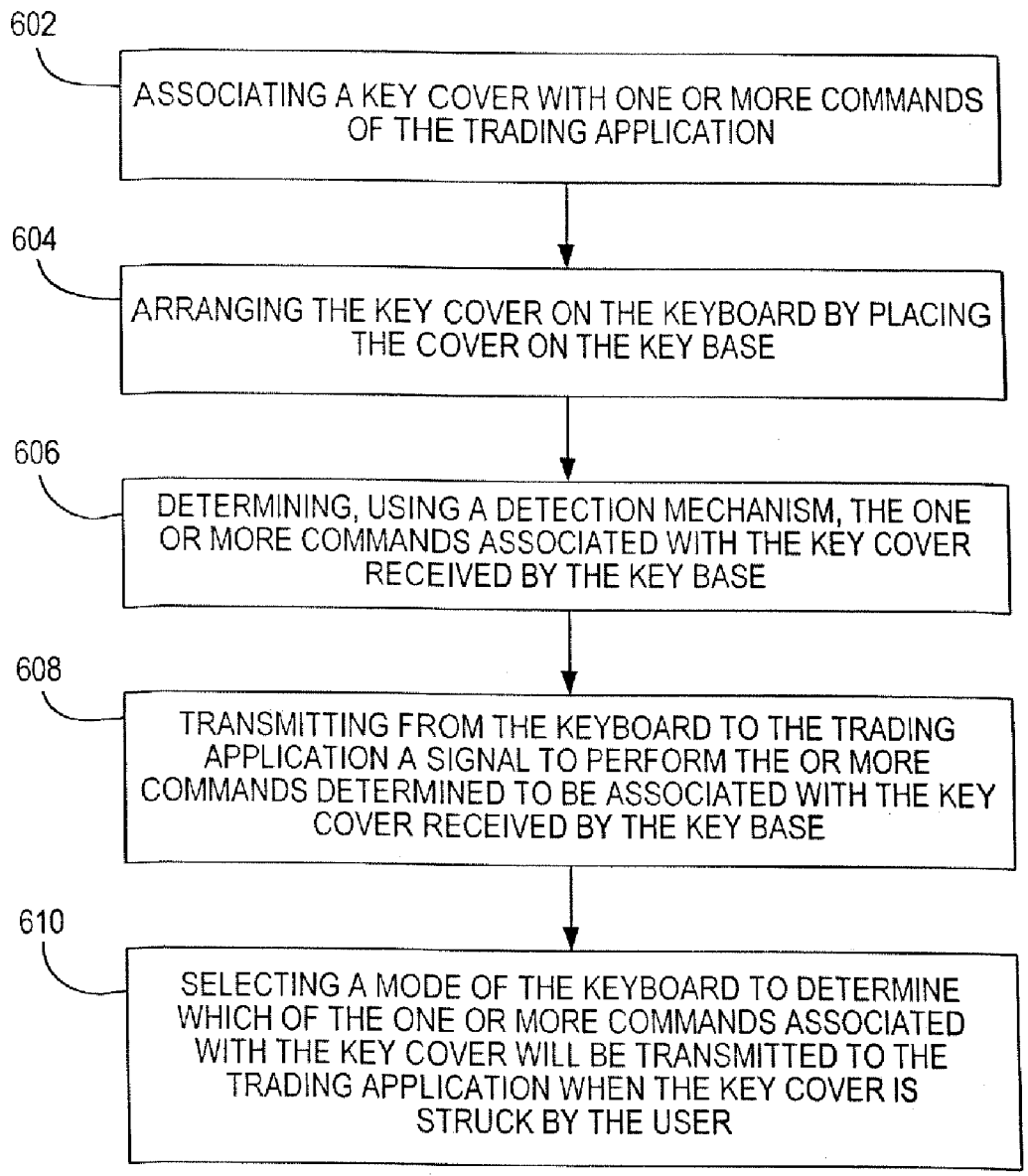
FIG. 6 illustrates a preferred approach of implementing the trading keyboard in accordance with the present invention.

In summary, FIG. 6 illustrates one preferred approach of implementing the trading keyboard of the present invention. A key cover is associated with one or more commands of the trading application at step 602. This association may be accomplished by marking or embedding an identification mechanism in the key cover to identify or distinguish the one or more commands associated with the key cover. At step 604, the self-identifying key covers may then be placed on or received by the key bases of the trading keyboard in any arrangement preferred by the user. The key covers may be placed on any key base on the keyboard and still retain the one or more commands (i.e., function) associated with the key cover. At step 606, a detection mechanism in the key base determines the one or more commands associated with the key cover received by the key base. This may be accomplished by using a detection mechanism that interacts with the identification mechanism of the key covers. For example, if a bar code is printed on the key cover, a bar code reader may be provided in the key base to determine the one or more commands associated with the key cover. At step 608, the trading keyboard transmits a signal to the trading application to perform a command from the one or more commands determined to be associated with the key cover received by the key base. Therefore, regardless of the key base on which a key cover is placed, the keyboard will send a signal to perform the same command associated with the key cover to the trading application when that key cover is struck by a user. At step 610, the user may select a mode of the keyboard to determine which command from the one or more commands associated with the key cover will be transmitted to the trading application when the key cover is struck by the user.

Figure 7:
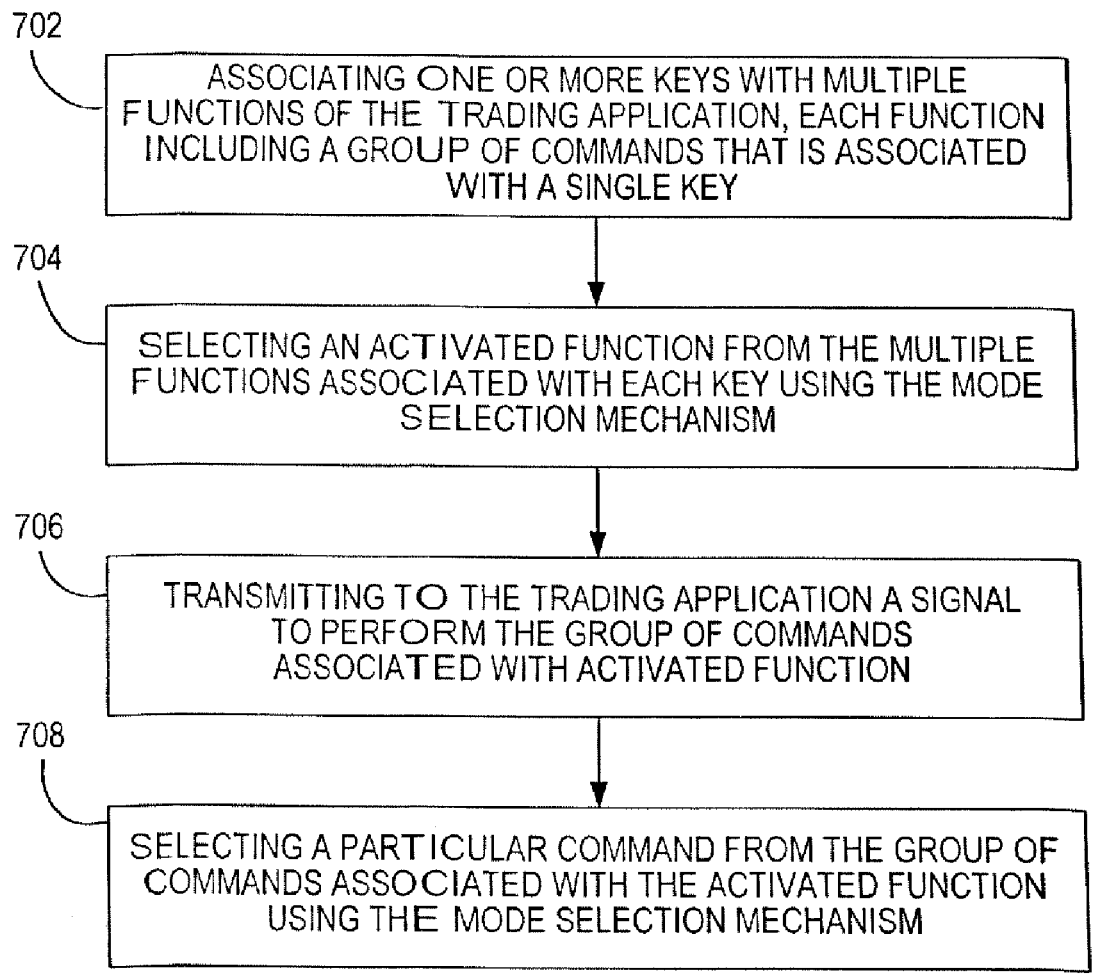
FIG. 7 illustrates a preferred approach of implementing the trading keyboard in accordance with the present invention.

FIG. 7 illustrates another preferred approach of implementing the trading keyboard of the present invention. At step 702, one or more keys of a conventional keyboard is associated with multiple functions of the trading application. Each function may include a group of commands of the trading application that is associated with a single key. At step 704, a mechanism for selecting a mode of the keyboard is used to determine which particular function from the multiple functions is activated for each key. For example, by changing the mode of key 410, the activated function for that key may be changed from "SELL/CXL" (FIG. 4) to "BUY/CXL" (FIG. 5). At step 706, the keyboard transmits a signal to perform the group of commands associated with the particular function of the key that has been activated. At step 708, the mode selection mechanism may also be used to select a particular command from the group of commands associated with the activated function. The particular command being transmitted to the trading application when the key is struck.

Thus, a fully-configurable trading keyboard is provided. One skilled in the art will appreciate that the present invention can be practiced by other than the described embodiments, which are presented for the purpose of illustration and not of limitation.

What is claimed is:

1. A keyboard comprising:
a plurality of key bases configured to receive a key cover;
a mechanism that alternatively disables or enables at least one of the plurality of key bases, wherein when enabled a key base generates a signal when struck; and
a first key cover disposed over at least one enabled key base and at least one disabled key base.

2. The keyboard of claim 1, comprising:
a second key cover having a first size, wherein the first key cover has a second size greater than the first size.

3. The keyboard of claim 1, comprising:
a second key cover having at least a one unit size, wherein the first key cover has at least a two unit size.

4. The keyboard of claim 1, wherein the plurality of key bases comprises at least 4 key bases uniformly disposed on the keyboard in an n ×m matrix, where n is greater than 1 and m is greater than 1.

5. The keyboard of claim 1, wherein the mechanism that enables or disables the key base comprises a jumper.

6. The keyboard of claim 1, wherein the first key cover comprises a mechanism for identifying the first key cover, each of the plurality of key bases comprises a mechanism for detecting the mechanism for identifying the first key cover, and wherein each of the plurality of key bases is configured to generate a signal associated with the first key.

7. The keyboard of claim 6, wherein the mechanism for identifying the first key cover comprises one of a computer chip, a resistor, a bar code, and a radio frequency device.

8. The keyboard of claim 6, wherein the mechanism for detecting the mechanism for identifying the first key cover is configured to detect the identifying mechanism of the first key cover when the first key cover is placed on a key base.

9. The keyboard of claim 1, comprising a mode selection key for selecting a mode of the keyboard from a plurality of possible modes, wherein the mode key determines which of a plurality of signals associated with the first key cover is generated when the key base is struck.

10. The keyboard of claim 9, wherein the first key cover is associated with a plurality of commands of an application and wherein the mode of the keyboard determines which of the plurality of commands associated with the first key cover is generated when the key base is struck.

11. A keyboard comprising:
   at least three key bases configured to receive at least one key cover;
   a mechanism that alternatively disables or enables a plurality of the at least three key bases, wherein when enabled a key base generates a signal when struck;
   a first key cover disposed over at least one enabled key base and a plurality of disabled key bases; and
   a second key cover disposed over at least one enabled key base, the second key cover having a size smaller than a size of the first key cover.

12. The keyboard of claim 11, wherein the keyboard comprises at least four key bases, the first key cover has at least a three unit size, and the second key cover has at least a one unit size.

13. The keyboard of claim 12, wherein the keyboard comrprises at least five key bases, at least four of the five key bases are uniformly disposed on the keyboard in a 2 ×2 matrix.

* * * * *